Sept. 16, 1969 R. L. VAN HUIS 3,467,065
POULTRY CAGE EGG COLLECTION SYSTEM
Filed July 12, 1968

INVENTOR.
ROBERT L. VAN HUIS
BY
ATTORNEYS

1

3,467,065
POULTRY CAGE EGG COLLECTION SYSTEM
Robert L. Van Huis, Zeeland, Mich., assignor to U.S. Industries, Inc., New York, N.Y., a corporation of Delaware
Filed July 12, 1968, Ser. No. 744,388
Int. Cl. A01k 31/14
U.S. Cl. 119—48       10 Claims

ABSTRACT OF THE DISCLOSURE

A poultry cage and egg collection apparatus wherein the poultry cages are long, generally parallel, cage rows which are spaced apart at least somewhat, with each cage row having a floor which inclines downwardly toward the front wall thereof and with the front wall of each cage row facing that of the other across the aforesaid space existing therebetween. The floor of one such cage row is higher than that of the other and the floor of each cage row communicates through the front wall of its cage row with a separate egg collection conveyor serving that cage row only, and not the other, with the two such egg collection conveyors being stacked in vertical alignment with each other between the spaced front walls of the cages.

Background

The housing of poultry within confinement cages is rapidly becoming the dominating approach in recent times, both with respect to birds maintained merely for meat production and also with respect to birds which are maintained for egg production purposes. In the latter case, the floors of the cages housing the birds are normally inclined downwardly toward the front wall thereof, such that eggs laid within the cages will automatically roll downwardly along the floor to that wall, where they pass through openings and move onto an egg-collection means located outside of the cage itself. Normally, this collection means comprises a trough-like member forming the bed of a conveyor mechanism, by which the eggs are automatically collected.

Cage installations for egg-laying birds are typically formed of cage units which include a pair of long, parallel cage rows which are mutually spaced somewhat. Between these cage rows is mounted an automatic feeding means and watering troughs, which the birds in the two spaced cage rows normally share. The floors of such pairs of spaced, parallel cage rows are often an integral member which extends beneath each row and across the space between the rows, and this latter portion of the floor is often used to define a conveyor bed in which a belt-type conveyor member is located. As will be understood, the latter functions as the egg-collection means for each of the two spaced cage rows, with the arrangement being such that eggs will roll down the inclined floor of each and directly onto the conveyor belt located therebetween.

The factor of egg breakage and other damage such as checking, cracking, and the like is of utmost importance in facilities using confinement cages of the aforementioned type, and within this industry there has always been an effort made to eliminate or at least diminish the effect of any and all observable sources of such egg damage. One source of damage which has never been significantly improved, however, is the common egg conveyor located between the spaced-apart cage rows, upon which numerous direct collisions occur between eggs rolling downwardly and outwardly of the cages from opposite directions, i.e., from each of the spaced cage rows. It has long been clear that eggs frequently suffered collisions in such an arrangement, but the convenience and overall effectiveness of this system, as well as the manufacturing economy thereof, have heretofore been generally regarded as more than enough reason to overlook the egg damage occurring in such systems. Consequently, such systems continue to be widely manufactured, purchased, and put into operation, with the ever-present egg breakage inherent in the system being considered for the most part as a regretable but necessary incident thereof.

Summary

In accordance with the present invention, a cage assembly and egg-collection apparatus is provided in which the egg breakage associated with previous similar cage assemblies is markedly reduced, while at the same time substantially all of the benefits of the aforementioned dual spaced-apart cage row assemblies are still maintained.

In accordance with the invention, a pair of egg collection conveyors are provided in vertically stacked relationship between each pair of mutually-spaced cage rows, and the floor portion of each individual cage row is arranged to communicate with a different one of the two egg conveyors, whereby each cage row has its own individual conveyor, upon which eggs roll from only one direction, thereby completely eliminating the possibility of collisions between eggs rolling from opposite directions. Further, the floor portion of each cage row is distinct and independent of that of the other such row, whereby rigidity in the floor portions is very substantially reduced. This effects a considerable improvement in yet another source of damage to eggs laid within the cages, i.e., floor rigidity.

Drawings

Preferred embodiment

Figure 1:
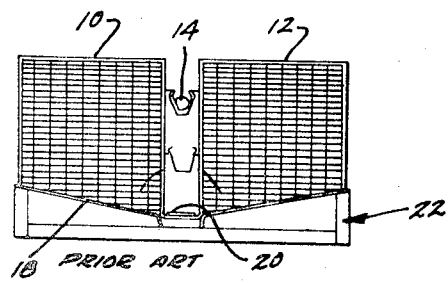
FIG. 1 is a simplified end elevation of a typical prior art cage assembly.

FIG. 1 illustrates the basic conventional cage apparatus presently in use. As illustrated, this apparatus includes a pair of mutually spaced cage rows 10 and 12, each of which is an elongated walled enclosure of trapezoidal cross-sectional shape, typically having a number of spaced, transversely oriented partitions which define a plurality of mutually distinct adjacent cage units within that individual cage row. In this prior art arrangement, a watering trough means 14 and a feeder trough means 16 are typically mounted between the two spaced cage rows, so that they may be shared by the birds in each such row.

The two cage rows 10 and 12 typically have a common integral floor portion 18 which extends beneath each and also beneath the central opeening or space between the two rows. In this area the floor is typically deformed downwardly at least slightly in a U-shaped configuration which defines a bed for a conveyor belt 20. This forms a common egg-conveyor for the two cage rows, since the floor portion 18 beneath each cage row inclines downwardly toward the other cage row and toward the conveyor, and eggs laid within either cage row will roll downwardly over the inclined floor and onto the conveyor belt 20 for automatic collection.

It is to be observed that with this conventional arrangement, there is nothing whatever to prevent collisions between eggs rolling downwardly onto the conveyor 20 from the two opposed cage rows, and in fact, this is a common occurrence which produces a significant amount of egg breakage. Also, the two spaced cage rows 10 and 12 with their common floor 18 are normally suspended in an elevated position by a rigid support means such as that shown at 22 and comprising a cross bar extending beneath the entire floor 18 and supporting the same at lease at the two outward extremities thereof and at the center, between the two cage rows, and frequently at numerous other points along the floor. As will be appreciated, this and similar types of suspension greatly rigidify the floor 18, not only at the points of actual contact between the suspension cross bar, but also at points therebetween, since the natural or inherent resilience of the floor at such points is strongly inhibited thereby. Rigid floors of this nature also tend to introduce a significant amount of egg breakage, which, it has been found, can be eliminated by relatively small amounts of "give" or yieldability.

Figure 2:
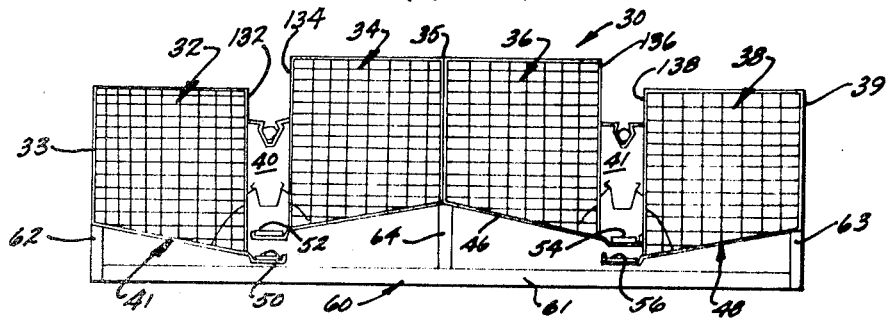
FIG. 2 is a simplified end elevation of the present cage assembly, showing the basic nature thereof.

The cage and egg collection apparatus of the invention is seen generally at 30 in FIG. 2, wherein the cage portion thereof is depicted as including four laterally-aligned and generally parallel elongated cage rows 32, 34, 36, and 38. Of these, the two cage rows 34 and 36 at the center of the assembly are positioned in a back-to-back relationship and, preferably, share a common rear wall portion 35. This arrangement places the front wall portions 134 and 136, respectively, of these two cake rows in an outwardly-facing orientation in which they are separated by spaces 40 and 41 from the front wall portions 132 and 138 of cage rows 32 and 38, respectively. As illustrated, this places the rear walls 33 and 39 of cage rows 32 and 38, respectively, in an outwardly-disposed orientation.

In accordance with conventional practice, the open spaces 40 and 41 between mutually-spaced cage rows serve as the mounting location for watering troughs and feeder mechanisms, but the particular nature of these components, as well as the specific manner of suspending the same is not considered to be an integral part of the present invention and may be carried out in accordance with conventional practice.

As illustrated, the cage rows 32, 34, 36, and 38 each have a floor portion 42, 44, 46, and 48, respectively; however, these floor portions are not an integral piece, although the floor portions 44 and 46 of the center two cage rows 34 and 36 may be of a single-piece unitary construction if desired. Thus, as distinguished from conventional practice as illustrated in FIG. 1, the cage apparatus of the invention does not have a one-piece integral floor which by its very rigidity tends to initiate egg breakage; further, the independent floor portions of each pair of cage rows in the present apparatus do not interconnect between or across the open spaces 40, 41 between the spaced front walls of any two cage rows. Instead, each floor portion extends beyond the front wall portion of that particular cage row and out into the open spaces 40, 41 therebetween, to act as guides or beds for belt-type conveyor members designated 50, 52, 54, and 56.

The entire cage and egg collection apparatus 30 of the invention is supported by a support means 60 having a cross bar 61 which extends completely beneath the four laterally adjacent cage rows, with upright support portions 62 and 63 at the opposite ends of the aforementioned cross bar engaging the outermost edges of the two outboard cage rows 32 and 38, and with the only other support for the apparatus 30 provided by a central upright support portion 64, which is aligned beneath the common rear wall 35 of central cages 34 and 36. Consequently, as will be appreciated, the floor portion of each individual cage row is very much unrestricted, and the natural resilience or yieldability thereof is therefore relatively uninhibited.

Even more importantly, moreover, is the relative vertical positioning of the various cage rows, which have directly comparable physical dimensions and structural features, and the floor portions of which are inclined downwardly at the same (or substantially the same) angle. The center two cage portions 34 and 36 are, however, supported in an elevated position with respect to the outboard cage rows 32 and 38, such that the floor portions 44 and 46 of the central cage rows are a predetermined distance higher than the floor portions 42 and 48 of the outboard cage rows. This serves to position the outwardly-extending ends of the floor portions of the central cage rows above the like floor portions of the outboard cage rows within the open spaces 40, 41 located therebetween, thus placing conveyors 50 and 52, and conveyors 54 and 56 in spaced vertical alignment.

Figure 3:
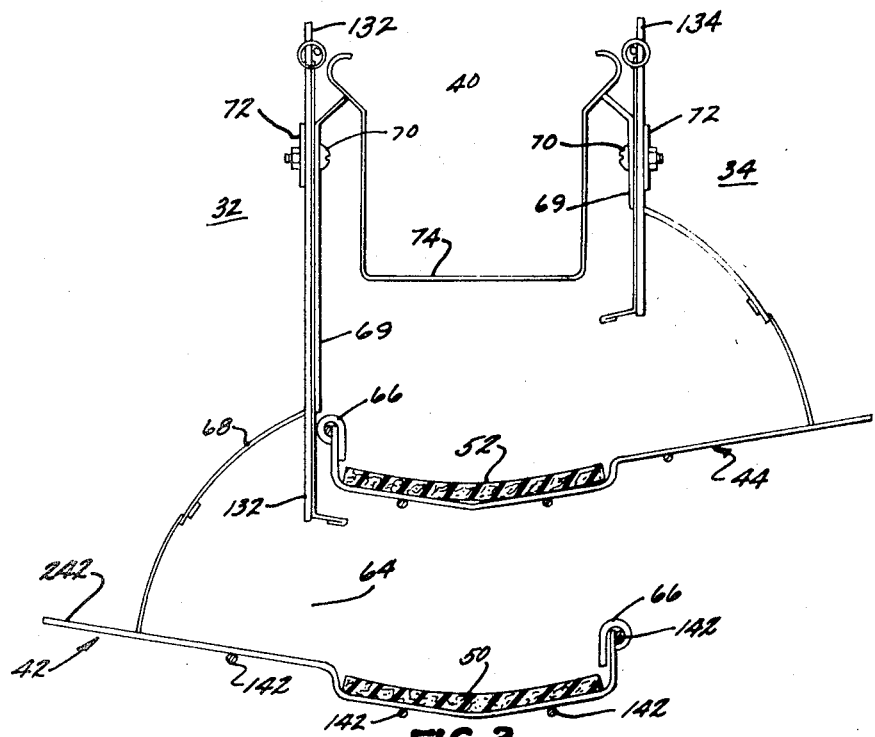
FIG. 3 is a greatly enlarged, fragmentary end elevation showing details of part of the structure shown in FIG. 2.

Structural details of this arrangement are shown in FIG. 3, wherein portions of cages 32 and 34 are illustrated. As seen here, the mesh floor 42 of cage row 32, comprised of intermeshed wire rods extending parallel to the cage row (designated 142) and transversely thereof (designated 242), angles downwardly toward and extends outward beyond the vertical plane in which the front side 132 of this cage row is located, i.e., beyond the projected intersection of the front wall with the floor. Beyond this projected intersection, the floor dips downwardly slightly in a U-shaped configuration to form the aforementioned channel-like guide for the egg collection conveyor belt 50. As will be observed, the extended portion of the floor is in cantilever suspension, and is unsupported. This provides a maximum degree of yieldability or flexibility over the entire floor, between the areas thereof which are supported or which are structurally attached to wall portions and transverse partitions (not specifically shown), which typically are utilized to divide the long cage rows into a plurality of adjacent segregated cage units, in a manner generally understood in the art.

As may be observed in FIG. 3, the front wall portion 132 of cage row 32 terminates above the level of the floor 42 thereof, thereby providing a passage or opening 64 which forms an outlet means for eggs laid upon the floor 42. That is, such eggs will roll down the inclined floor 42 and through the opening 64 as upon a runway, from which they pass directly onto the conveyor belt 50. As illustrated, a rubber bumper 66 in the form of an elongated P-shaped element is preferably fitted over the outermost end of the floor 42, which forms the outboard extremity of the conveyor guide, in order to cushion the contact thereagainst of eggs which roll downwardly onto the conveyor 50 with sufficient speed to roll completely across the latter.

As noted previously, and as illustrated in detail in FIG. 3, structural details of the floor 44 of cage row 34 are, in all essential aspects, identical to those just described in connection with cage row 32 and its floor 42, with floor portion 44 extending cantilevered out into the opening 40 between cage rows 32 and 34, and with a bumper 66 at the outboard edge of that portion of floor 44 forming the bed for conveyor belt 52.

It may be observed that other structural details are shown in FIG. 3, including the placement of rounded egg-guard members 68 which curve downwardly and inwardly of each cage row near the bottom of the front wall portion thereof and over the egg-outlet openings 64 noted previously. As illustrated, these egg guards include a flat, upwardly-extending portion 69 by which they are secured to the respective front walls of their cages, as by bolts 70 and backing plates 72, with the upper end extremities of portions 69 extending at an angle into the space 40 between the cage rows to support a feeder conveyor trough 74. Details such as this are not actually an integral part of the present invention, however, even through they are a very desirable aspect of implementing the same. The specific nature of the egg guards 70 is the subject matter of copending application Ser. No. 692,841, filed Dec. 22, 1967, to which reference is hereby made. For present purposes, these structures are shown merely as desirable environmental details.

As will be appreciated from the foregoing, the present poultry cage and egg-collection apparatus provides a unique and compact configuration, wherein closely adjacent but mutually separate cage rows have their own independent egg-collection conveyors, by which markedly decreased egg breakage is provided due to the decreased incidence of collisions between rolling eggs. Although separate conveyors are provided for each cage row, however, the two conveyors are closely spaced into a relatively narrow opening and therefore the provision of separate conveyors does not result in the wasting of valuable space, but, on the other hand, merely makes better use of space which was already available. Moreover, the construction of the invention results in increased flexibility (or decreased structural rigidity) of the floor portions themselves, and thus will decrease the incidence of egg breakage in and of itself.

While no specific belt return arrangement is illustrated in the drawings for the conveyor members 50, 52 and 54, 56, it is presently contemplated that each will be a separate endless belt, with belt 50 enclosed within belt 52 and belt 54 enclosed within belt 56. However, belts 50 and 52, as well as belts 54 and 56, may comprise single endless conveyor members, such that belts 52 and 56 will form the returns of belts 50 and 54, respectively, moving in the opposite direction therefrom.

It is entirely conceivable that upon examining the foregoing disclosure, those skilled in the art may devise embodiments of the concept involved which differ somewhat from the embodiment shown and described herein, or may make various changes in structural details to the present embodiment. Consequently, all such changed embodiments or variations in structure as utilize the concepts of the invention and clearly incorporate the spirit thereof are to be considered.

The embodiments of the invention in which an exclusive property or privilege is claimed are defined as follows.

1. A poultry cage and egg-collection apparatus comprising in combination: a pair of elongated poultry cage rows disposed substantially parallel to and laterally adjacent each other, with vertically oriented cage wall portions separating the two such rows; feed supply means mounted between said wall portions providing a common source of feed for each of said rows of cages each of said cage rows having a floor portion; each of said cage rows also having egg outlet means communicating with its said floor portion and facing the egg outlet means of the opposite cage row, by which eggs laid within the cage rows may leave the same and be collected; and a pair of separate egg conveyor means stacked one above the other below said feed supply means, one of said egg conveyor means for a single one of said cage rows in said pair thereof and each communicating with the said egg outlet means of one such cage row; said pair of egg conveyor means disposed in close proximity to each other.

2. The apparatus of claim 1, wherein said egg outlet means of each cage row comprises at least one passage opening located generally at the said projected intersection of the respective cage wall portions and cage floor portions of each such cage row; each such passage opening forming a runway for eggs to roll upon; and each of said egg conveyor means being disposed laterally adjacent one such projected intersection and in open communication with one such runway, such that eggs may freely roll from such runway onto such conveyor means.

3. The apparatus of claim 1, wherein one of said pair of separate egg conveyor means is positioned above the other thereof.

4. The apparatus of claim 3, wherein said two egg conveyor means in said pair thereof are positioned in vertical alignment with each other.

5. The apparatus of claim 4, wherein said pair of cage rows are spaced apart laterally from each other and each such row has its own individual vertical cage wall portion, said wall portions being mutually faced and oppositely disposed, and said vertically aligned conveyor means being positioned between said spaced cage wall portions.

6. The apparatus of claim 5, wherein said floor portion of each cage row is tilted to roll eggs laid thereupon toward the said wall portion of such cage and toward said projected intersection of wall and floor cage portions, and wherein the floor portion of one such cage row is higher at corresponding points than the floor portion of the other such cage row.

7. The apparatus of claim 6, wherein said egg outlet means of each cage row comprises at least one passage opening located generally at the said projected intersection of the respective wall and floor cage portions of each such cage row; each such passage opening forming a runway for eggs to roll upon; and each of said egg conveyor means being disposed laterally adjacent such projected intersection and in open communication with such runway, such that eggs may freely roll from runway to conveyor means.

8. The apparatus of claim 7, wherein the floor portion of each of said cage rows extends outwardly thereof beyond said projected intersection to form at least part of a conveyor bed for the conveyor means of that respective cage row.

9. The apparatus of claim 8, wherein each of said extending parts of said floor portions are suspended in cantilever.

10. A poultry cage and egg-collection apparatus, comprising in combination: a grouping of four elongated poultry cage rows, each disposed substantially parallel to the others; each of said cage rows having a floor portion and front and rear wall portions; two of said cage rows being in close back-to-back relationship, with their front wall portions disposed outwardly; each of the other two of said cage rows being positioned on opposite sides of said two back-to-back cage rows, with the front wall portions of each of said other two cage rows spaced from and facing the front wall portion of one of the said back-to-back cage rows; feed supply means mounted between said front wall portions providing a common source of feed for each of the said rows of cages of the said facing wall portions each of said cage rows having egg outlet means communicating with its said floor portion and facing the egg outlet means of the opposite cage row, by which eggs laid within each cage row may leave the same and be collected; and a separate individual egg conveyor means for each of said cage rows; each of said conveyor means communicating with the egg outlet means of its respective cage row; and said conveyor means arranged in two pairs, each one of such pairs being stacked one above the other below said feed supply means.

References Cited

UNITED STATES PATENTS

| | | | |
|---|---|---|---|
| 2,793,614 | 5/1957 | Duncan | 119—48 |
| 2,987,038 | 6/1961 | Cole | 119—18 |
| 3,002,494 | 10/1961 | Murray | 119—48 |
| 3,109,413 | 11/1963 | Patchett | 119—48 |
| 3,124,102 | 3/1964 | Kurtz et al. | 119—48 |
| 3,164,129 | 1/1965 | Rigterink | 119—45 |
| 3,241,523 | 3/1966 | Kurtz et al. | 119—48 |
| 3,306,259 | 2/1967 | Willauer | 119—48 |
| 3,319,606 | 5/1967 | Virgil | 119—48 X |

ALDRICH F. MEDBERY, Primary Examiner